United States Patent
Ratermann et al.

(10) Patent No.: US 6,516,712 B1
(45) Date of Patent: Feb. 11, 2003

(54) STEAM GENERATOR FOR CONVECTION OVEN AND RELATED HEAT ACCUMULATOR CONSTRUCTION

(75) Inventors: Philip A. Ratermann, Tipp City, OH (US); Richard H. VanCamp, Aurora, IL (US)

(73) Assignee: Piemark Feg L.L.C., Wilmington, DE (US)

( * ) Notice: Subject to any disclaimer, the term of this patent is extended or adjusted under 35 U.S.C. 154(b) by 0 days.

(21) Appl. No.: 10/138,475

(22) Filed: May 3, 2002

(51) Int. Cl.[7] .............................. A21B 1/00; A21B 1/08; A21B 1/46; A23L 1/00; A47J 37/00
(52) U.S. Cl. ............................. 99/476; 99/352; 99/447; 99/477; 99/479; 126/20; 138/37; 138/38; 138/108
(58) Field of Search ........................... 99/352, 447, 448, 99/443 R, 443 C, 477–479, 427; 126/20, 355.1, 359.1; 34/231; 122/31.1, 35; 138/38, 37, 108; 366/338; 165/4, 9.1, 10, 10 A, 109.1, 902

(56) References Cited

U.S. PATENT DOCUMENTS

| | | | |
|---|---|---|---|
| 1,003,852 A | 9/1911 | Zetschok et al. | |
| 1,313,624 A | 8/1919 | Evans et al. | |
| 1,543,128 A | 6/1925 | Simpson | |
| 1,544,481 A | 6/1925 | Reese | |
| 1,632,492 A | 6/1927 | Mayer et al. | |
| 1,637,618 A | 8/1927 | Kuhtz | |
| 1,662,747 A | 3/1928 | Izzo | |
| 1,762,465 A | 6/1930 | Bovey | |
| 1,863,432 A | 6/1932 | Bobbin et al. | |
| 1,878,353 A | 9/1932 | Watter | |
| 1,878,519 A | 9/1932 | Hoppe | |
| 2,060,992 A | 11/1936 | Jackson | |
| 2,141,591 A | 12/1938 | Bonner | |
| 2,767,667 A | 10/1956 | Spooner | |
| 3,119,355 A | 1/1964 | Gawlitza et al. | |
| 3,567,487 A | 3/1971 | Poppe et al. | |
| 3,627,036 A | 12/1971 | Gilbert | |
| 3,826,240 A | 7/1974 | Miyahara | |
| 3,954,053 A | 5/1976 | Johansson | |
| 4,202,259 A | 5/1980 | Johansson | |
| 4,378,005 A | * 3/1983 | Otto | ........................ 126/20 X |
| 4,612,974 A | * 9/1986 | Yanadori et al. | .............. 165/10 |
| 4,689,303 A | * 8/1987 | Kraft et al. | ............. 219/400 X |
| 4,753,220 A | 6/1988 | Lutzen et al. | |
| 4,782,214 A | 11/1988 | Voegtlin | |
| 4,784,218 A | 11/1988 | Holl | |
| 4,785,151 A | 11/1988 | Voegtlin | |
| 4,892,083 A | 1/1990 | Konig | |

(List continued on next page.)

FOREIGN PATENT DOCUMENTS

| | | |
|---|---|---|
| CH | 532663 | 1/1970 |
| CH | 548161 | 4/1974 |
| DE | 2519849 | 5/1975 |
| DE | 2616329 | 4/1976 |
| ES | U9003455 | 12/1990 |
| ES | U90034556 | 12/1990 |
| ES | U9100091 | 1/1991 |
| GB | 201029 | 7/1922 |
| GB | 2014029 | 8/1979 |
| RU | 253988 | 2/1967 |
| RU | 1312364 A1 | 8/1985 |
| WO | 84/01266 | 4/1984 |

*Primary Examiner*—Timothy F. Simone
(74) *Attorney, Agent, or Firm*—Thompson Hine LLP (57) ABSTRACT

A steam generator is formed by a plurality of similar heat accumulator units stacked vertically. Each heat accumulator unit of the stack has an orientation different than any adjacent heat accumulator unit so that multiple heat accumulator elements of the each heat accumulator unit align with respective open spaces of any vertically adjacent heat accumulator unit.

24 Claims, 8 Drawing Sheets

U.S. PATENT DOCUMENTS

| | | |
|---|---|---|
| 4,984,557 A | 1/1991 | Konig |
| 5,129,384 A | 7/1992 | Parks |
| 5,161,517 A | 11/1992 | Johansson |
| 5,228,385 A * | 7/1993 | Friedrich et al. .............. 99/352 |
| 5,394,791 A | 3/1995 | Vallee |
| 5,552,578 A | 9/1996 | Violi |
| 5,601,013 A | 2/1997 | Larsson et al. |
| 5,617,839 A | 4/1997 | Jennings et al. |
| 5,653,164 A | 8/1997 | Vallee |
| 5,394,791 A | 9/1998 | Vallee |
| 6,023,050 A | 2/2000 | Violi |

* cited by examiner

STEAM GENERATOR FOR CONVECTION OVEN AND RELATED HEAT ACCUMULATOR CONSTRUCTION

TECHNICAL FIELD

This application relates generally to a steam generator for use in a convection oven such as that used in a commercial bakery, and to a heat accumulator unit used to form the steam generator.

BACKGROUND

When bread is baked in a convection oven in which the bread is contacted with circulating heated air, it is known to introduce steam or water vapor into the oven chamber for a brief period at the beginning of the baking process to impart a desired color and crispness to the crust of the bread.

In U.S. Pat. No. 5,653,164, which is assigned to the assignee of the present application, a steam generator construction includes first and second differently configured heat accumulator units that can be stacked into a desired configuration where heat accumulator elements of one unit align with open spaces of a vertically adjacent unit. However, the use of two differently configured heat accumulator units requires two machines and associated tooling for producing the two different units.

Accordingly, it would be desirable to provide a steam generator construction in which similar heat accumulator units are stacked into a desired arrangement.

SUMMARY

In one aspect, a steam generator for use in a convection oven includes a plurality of similar heat accumulator units. Each of the similar heat accumulator units has a plurality of heat accumulator elements and a plurality of open spaces defined between the heat accumulator elements, and a position of each heat accumulator element being fixed relative to other heat accumulator elements of the unit. The similar heat accumulator units are vertically stacked, with each heat accumulator unit rotated relative to any adjacent heat accumulator unit so that multiple heat accumulator elements of each heat accumulator unit align with respective open spaces of any vertically adjacent heat accumulator unit.

In another aspect, a steam generator for use in a convection oven includes a plurality of similar heat accumulator units. Each of the similar heat accumulator units has a plurality of heat accumulator elements arranged in a row and column pattern, a position of each heat accumulator element being fixed relative to other heat accumulator elements of the row and column pattern, and the row and column pattern being positioned off-center relative to a first side wall and a second side wall of the unit. The similar heat accumulator units are vertically stacked in an alternating sequence with the first side wall of each heat accumulator unit aligned with the second side wall of any vertically adjacent heat accumulator.

In a further aspect, a steam generator for use in a convection oven includes first and second similar heat accumulator units. Each heat accumulator unit has stacking means and a plurality of heat accumulator elements arranged in a row and column pattern that is positioned off-center relative to the stacking means. A plurality of open spaces are defined between the heat accumulator elements of the row and column pattern of each unit, and a position of each heat accumulator element is fixed relative to other heat accumulator elements of the row and column pattern. The first and second heat accumulator units are vertically stacked adjacent each other, with stacking means of the first heat accumulator unit contacting stacking means of the second heat accumulator unit. The first heat accumulator unit has an orientation that is different than an orientation of the second heat accumulator unit so that multiple heat accumulator elements of the first heat accumulator unit align with respective open spaces of the second heat accumulator unit.

DESCRIPTION

In a typical operation of a convection oven containing a steam generator, the oven is pre-heated to a predetermined temperature for a period of time to allow the steam generator to reach a peak temperature for vaporizing water into steam. The bread or other goods to be baked are loaded onto a wheeled rack and placed in the oven chamber and the oven door is closed. The rack is then lifted off the floor by a lifting device and begins to rotate at a set speed. The steaming process is started by spraying water over the heat accumulating units to produce steam uniformly over the total height of the steam generator. The steam produced infiltrates the entire oven and condenses on the cool surface of the unbaked bread or other goods. At the end of the predetermined steaming period (usually about 10 to 30 seconds), the flow of water to the steam generator is discontinued and the bake cycle started. During the bake period a fan continuously circulates the heated air throughout the entire system. For additional batches, the procedure is repeated except that it is generally not necessary to pre-heat the oven since the previous baking cycle provides sufficient heat.

Figure 1:
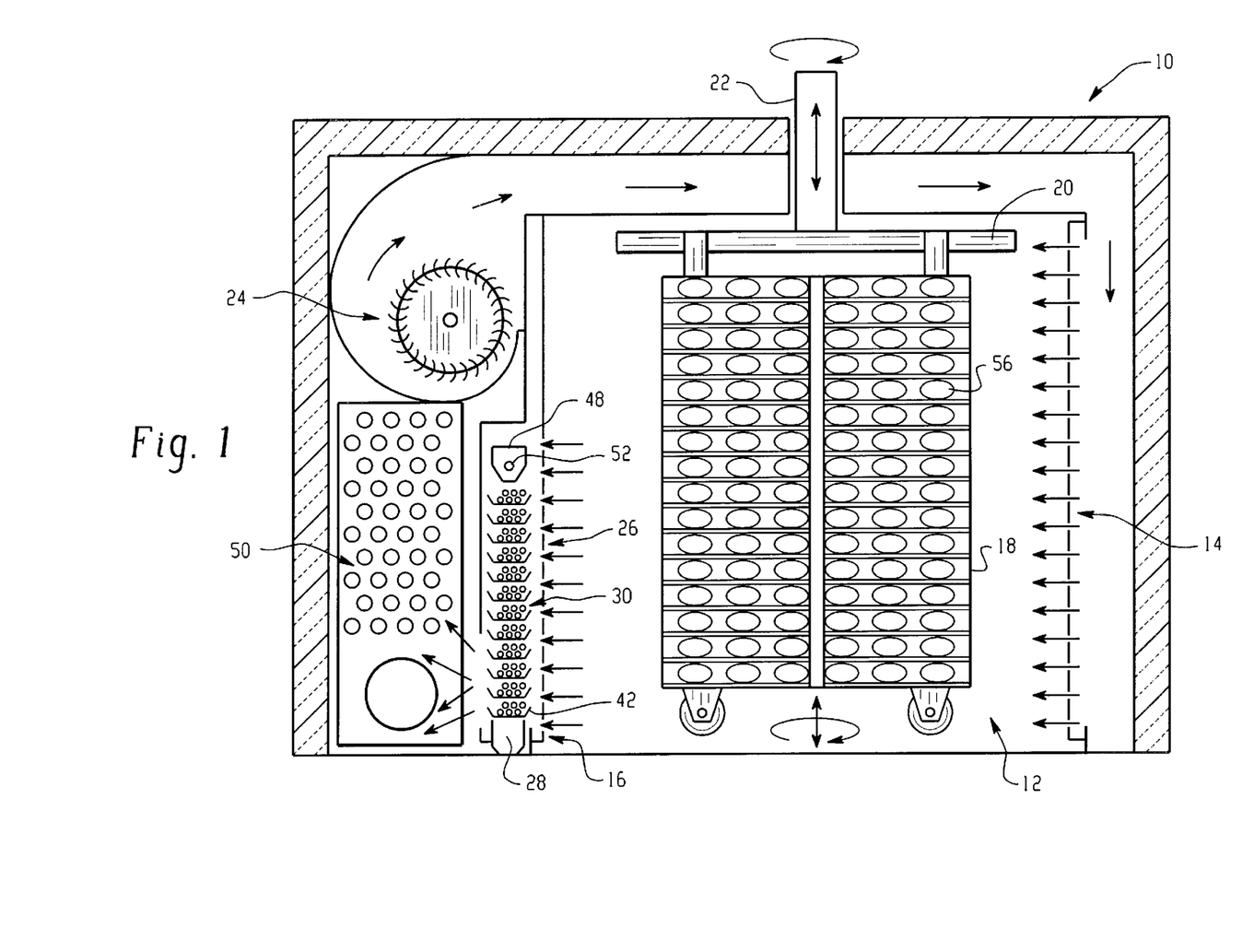
FIG. 1 shows a side elevation of a baking oven including a steam generator.
Figure 2:
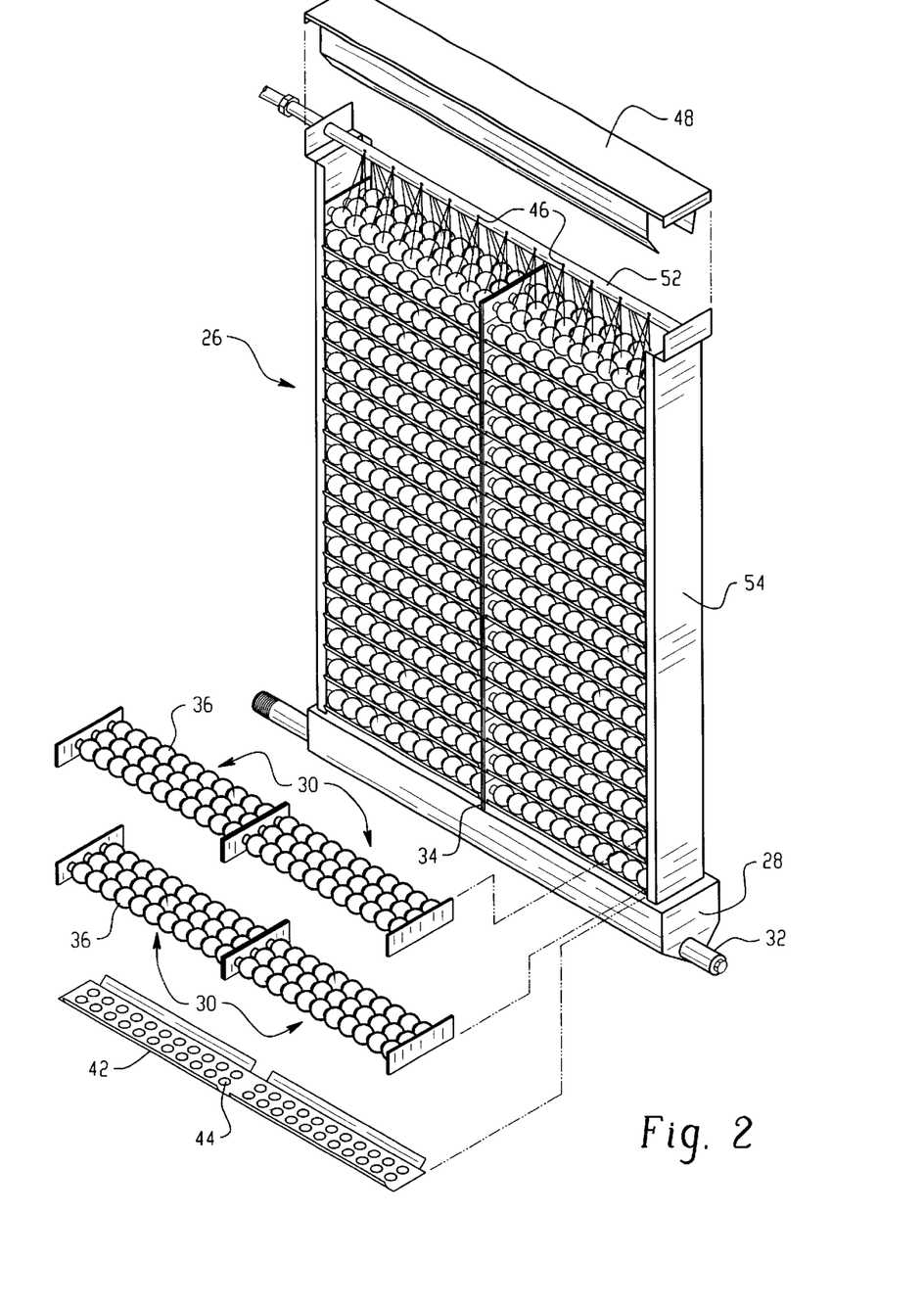
FIG. 2 shows a perspective view of one embodiment of a steam generator.

As shown in FIG. 1, a typical oven 10 has a chamber 12 including an apertured upstream side 14 and a partially apertured downstream side 16. Disposed within the chamber 12 is a rack 18 connected at its upper end to a rotatably driven carrier 20 carried by a vertical shaft 22. The rack 18 can be raised and lowered by a lift mechanism (not shown) located on the upper end of the shaft 22. Water vapor is absorbed by the heated air from the steam generator 26 which is shown in FIG. 2 and circulated throughout the oven chamber 12 in a closed path by a fan 24. Goods to be baked such as bread 56 are placed in pans held by rack 18 which rotates to uniformly expose the bread 56 to the heated, steamcontaining air as it flows through the oven chamber 12.

The steam generator 26 may be disposed outside the baking compartment and, in the illustrated embodiment, comprises a base 28 above which are located a plurality of similar heat accumulator units 30. The base 28, which contains a receptacle and a drain pipe 32 (FIG. 2), serves as a sump for collecting and draining away any excess water accumulated during the steam forming process. The heat accumulator units 30 may be held in place by end panels 54 vertically affixed to each end of the base 28 and to the corresponding ends of the steam generator cover 48. Where the steam generator 26 is of sufficient size to accommodate or require two or more of the heat accumulator units 30 in a head-to-tail arrangement, side support panels 34 may be vertically affixed to the base 28 and to the cover 48 intermediate the two end panels 54 to support the heat accumulator units 30. Horizontally disposed baffles 42 containing multiple perforations 44 may be placed at spaced apart locations along the stacked units to aid in the distribution of water to the heat accumulator elements 36, and to uniformly accumulate steam from the top to the bottom of the steam generator 26. However, the use of such baffles is not required.

Figure 3:
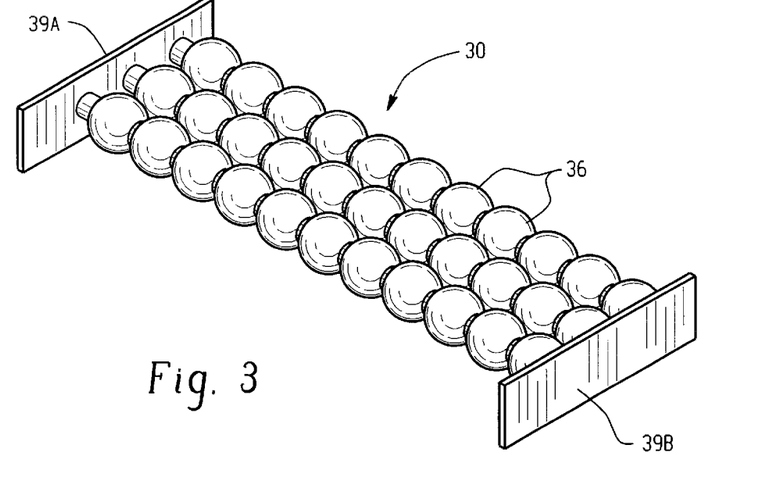
FIG. 3 shows a perspective view of one embodiment of a heat accumulator unit.
Figure 4:
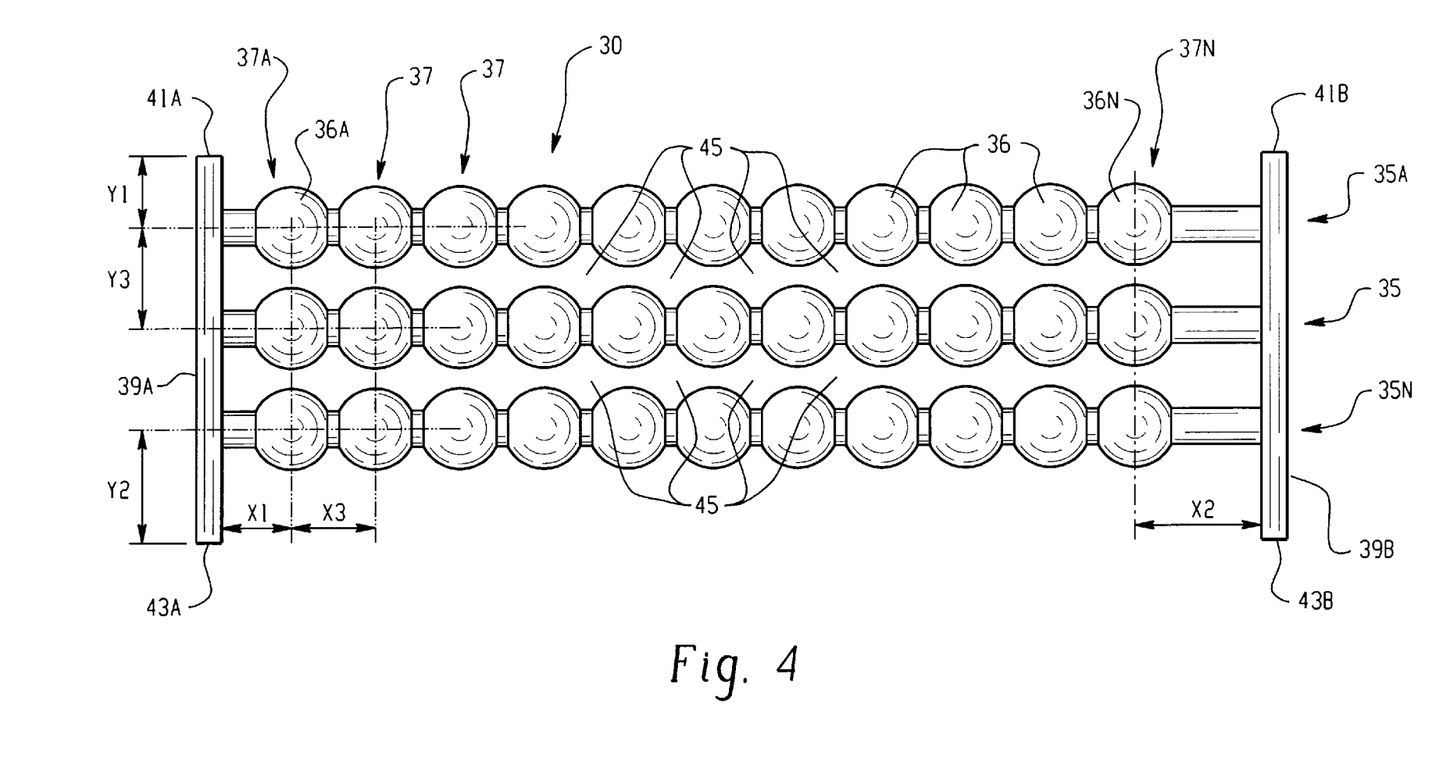
FIG. 4 shows a to view of the unit of FIG. 3.
Figure 5:
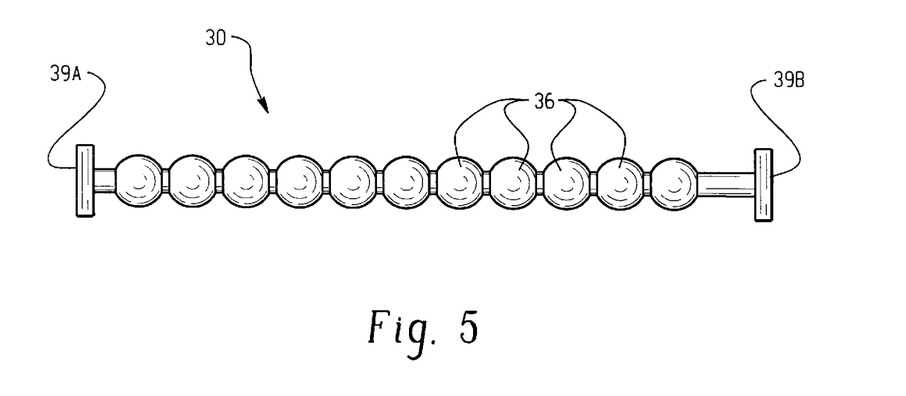
FIG. 5 shows a side elevation of the unit of FIG. 4.

The similar heat accumulator units 30 used to form the steam generator 26 are best described with reference to FIGS. 3–5. Each heat accumulator unit 30 includes a plurality of rows 35 of heat accumulator elements 36, each row of heat accumulator elements integrally joined to each other. Three rows are illustrated, but any plurality of rows could be used. Notably, the rows 35 extend between side walls 39A and 39B having respective first and second ends 41A, 41B and 43A, 43B. In this embodiment, walls 39A and 39B are used for vertically stacking units atop each other.

The rows 35 are arranged in an off-center manner relative to the side walls 39A, 39B. In particular, a distance Y1 between side wall first ends 41A, 41B and a centerline of a defined, adjacent first row 35A is different than a distance Y2 between side wall second ends 43A, 43B and a centerline of a defined, adjacent last row 35N. The heat accumulator elements 36 of each row 35 are aligned to produce a row and column pattern, with a plurality of columns 37 as shown. The columns 37 are also arranged in an off-center manner relative to the side walls. In particular, a distance X1 between a centerline of a defined first column 37A (or defined first element 36A of each row) and adjacent side wall 39A is different than a distance X2 between a centerline of a defined a last column 37N (or defined last element 36N of each row) and adjacent side wall 39B. The difference in distance between X2 and X1 and the difference in distance between Y2 and Y1 is selected to allow placement of accumulator elements 36 of a given unit 30 in a position above or below the gaps 45 of any immediately adjacent heat accumulator unit 30. In the illustrated embodiment, for example, the distance difference X2−X1 may be selected as one half the distance X3, where X3 is the standard distance between centerlines of adjacent columns 37. The distance difference Y2−Y1 may be selected as one half the distance Y3, where Y3 is the standard distance between centerlines of adjacent rows 35. The resulting nesting arrangement that can be achieved is described with reference to FIGS. 6 and 7.

Figure 6A:
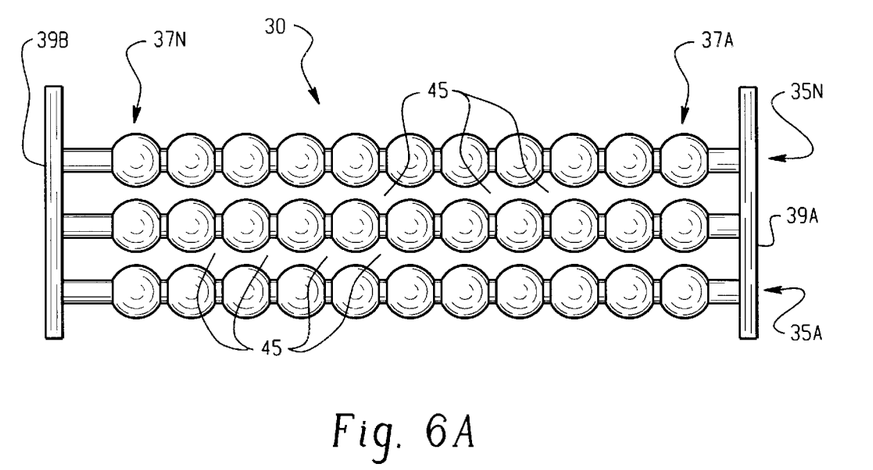
FIGS. 6A and 6B show similar heat accumulator units rotated relative to each other.
Figure 6B:
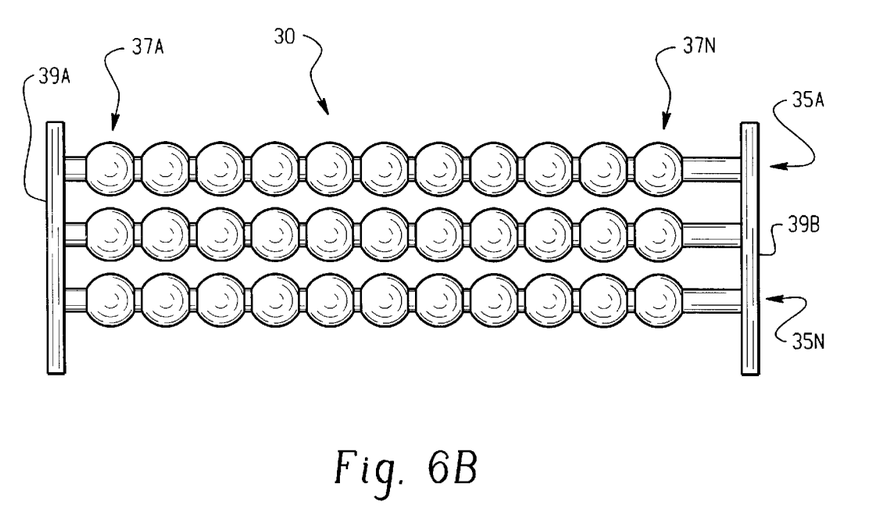
Figure 7:
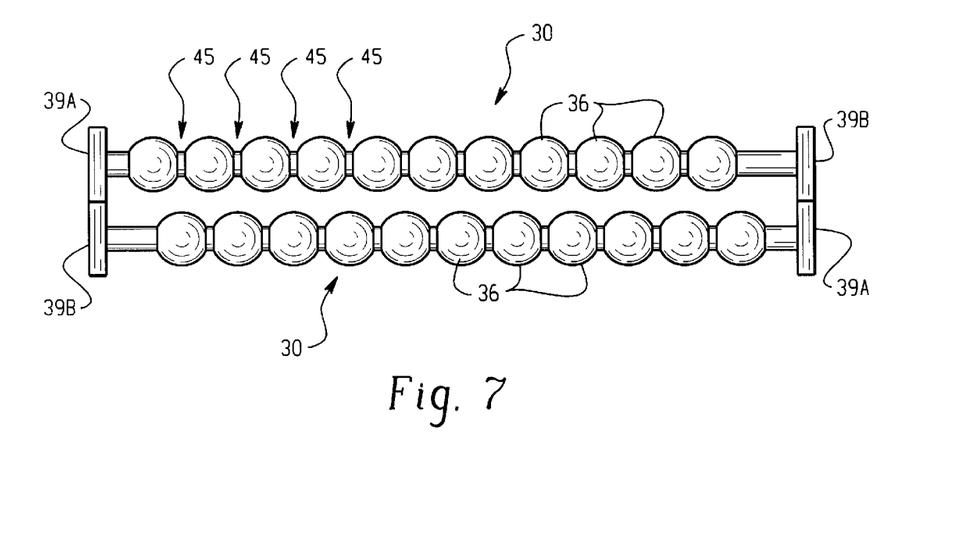
FIG. 7 shows the units of FIG. 6 in a stacked arrangement.

In particular, FIG. 6A illustrates a top view of one heat accumulator unit 30 arranged in a first orientation and FIG. 6B illustrates a top view another heat accumulator unit 30 arranged in an orientation that is rotated 180° about a vertical axis (into the page in FIGS. 6A and 6B) relative to the unit of FIG. 6A. Stacking the unit 30 of FIG. 6B atop the unit 30 of FIG. 6A while maintaining the differing relative orientation results in the stacked units of FIG. 7 where the side wall 39A of the top unit rests on side wall 39B of the bottom unit, and side wall 39B of the top unit rests on side wall 39A of the bottom unit. Further, accumulator elements 36 of the bottom unit align with openings 45 of the top unit. This alignment reduces the amount of water that can fall directly to the bottom of a steam generator when supplied at the top of the generator by reducing or eliminating unobstructed vertical paths downward through the steam generator. Continued stacking of units 30 results in a steam generator of virtually any desired height.

In the illustrated embodiment each of the heat accumulator elements 36 is ball-shaped, preferably having a substantially spherical shape. The spherically shaped elements 36 of each row 35 are integrally joined together along a central axis in a linear configuration. The heat accumulator units 30 may be cast from a metal such as cast iron using a mold having the desired shape and dimensions. Other materials suitable for being heated by the oven air to a high temperature so as to produce steam when contacted by water could also be used. While ball-shaped elements 36 are illustrated, other bulbous shapes might be used, including shapes having flats. The number of heat accumulator elements 36 present in the heat accumulator units 30 is not critical, however, for exemplary purposes each accumulator unit may be about 12 to 18 inches in length, and the number of heat accumulator elements 36 of each heat accumulator unit 30 may be about 10 to 12 with each element 36 being about 1 to 1.5 inches in diameter.

Just prior to the bake cycle, water is provided to the steam generator 26 through apertures 46 (FIG. 2) in water supply line 52. The water sprayed from aperture 46 is deflected by the sides of steam generator cover 48 and directed downwardly to contact the rows of heat accumulator elements 36. As the water contacts the heat accumulator elements 36, the accumulated heat in the elements 36 is sufficient to transform the water into vapor along the height of the steam generator 26. During the steaming cycle (usually about 15 to 30 seconds) the oven fan 24 (FIG. 1) may be stopped to avoid loss of steam in the oven air duct. The moisture-containing air is introduced directly through the apertured downstream side wall 16 and uniformly contacts and condenses on the unbaked and cold bread 56. When the steam cycle is finished, the fan 24 is activated again and the heat exchanger 50 reheats the moisture-laden air. At the beginning of the bake cycle, the fan is activated causing the air flowing through the partially apertured downstream side wall 16 to reheat the steam generator for the next bake as it flows freely between the rows of heat accumulator units 30. The heated, moisture-containing air is circulated through the oven chamber until the baking process has been completed, at which time the baked goods are removed and the oven loaded with another batch to be baked.

Figure 8:
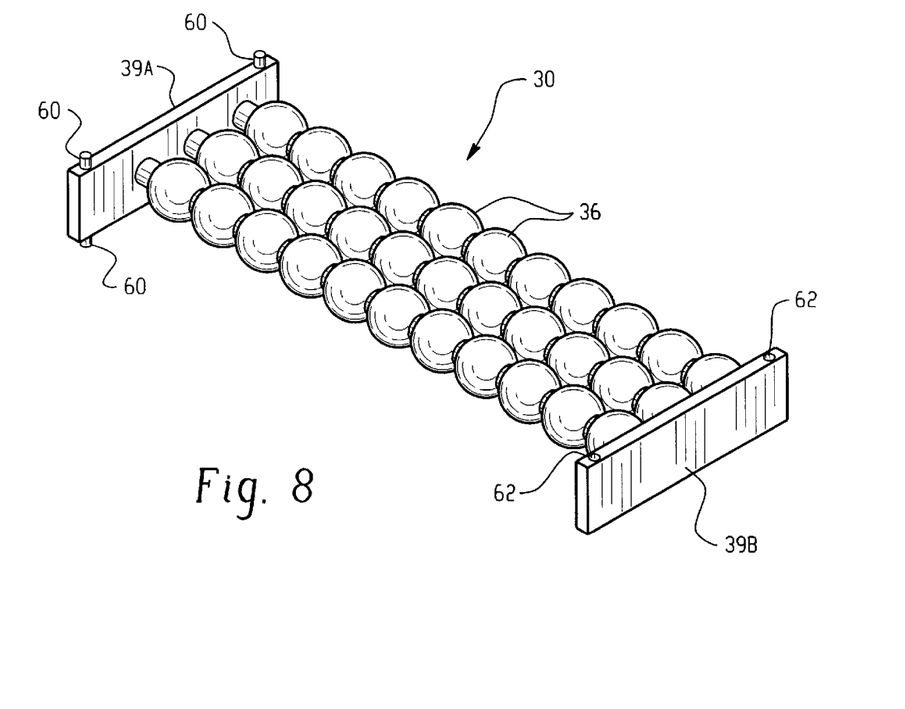
FIG. 8 shows an alternative embodiment of a heat accumulator unit.

In another heat accumulator unit embodiment shown in FIG. 8, the units 30 may include top and bottom vertical posts 60 arranged on one side wall 39A and top and bottom bores 62 arranged on other side wall 39B to facilitate stacking. As used herein the term "bore" encompasses holes, through-holes, recesses and depressions. In particular, the posts of one unit 30 will be received in the bores 62 of any immediately adjacent unit 30 when stacked due to the 180° of relative rotation between adjacent units 30. The posts 60, or other protrusions, and bores 62 could be sized to provide a vertical spacing between side walls of vertically adjacent units if desired. Further, the side walls 39A and 39B could be eliminated entirely with appropriate posts, or other protrusions, and bores positioned at the periphery of each unit for the purpose of stacking. Further, the use of only posts, or other protrusions, for the purpose of stacking is contemplated, with posts of vertically adjacent units resting upon each other. Still further, the use of only through type bores for the purpose of stacking is contemplated, the through type bores of adjacent units resting upon each other, where a steam generator frame is provided with vertical posts aligned for passing through the through apertures of each unit. In any case, the stacking structure can generally be described as stacking feet, where the feet may be of any shape, and in many embodiments the stacking feet may be complimentary, meaning that the feet of any unit are configured to mate in some way with feet of a vertically adjacent unit.

Figure 9:
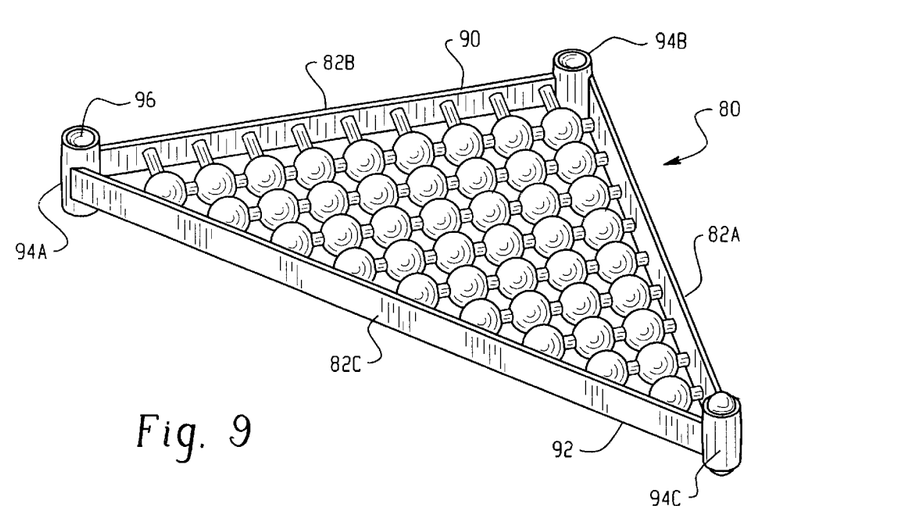
FIGS. 9–10 show an alternative embodiment of a heat accumulator unit.
Figure 10:
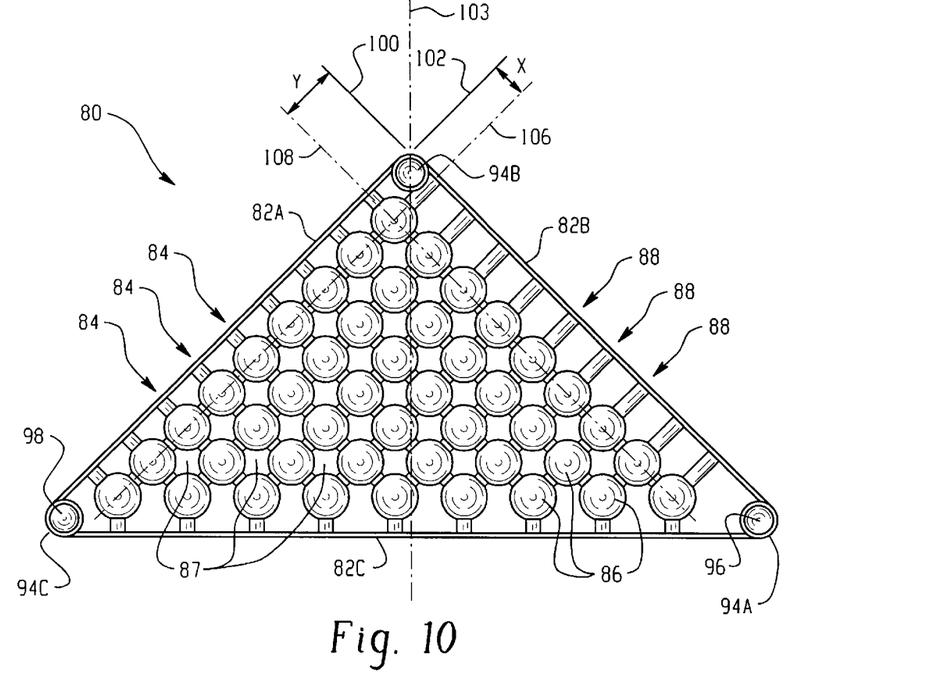
Figure 11A:
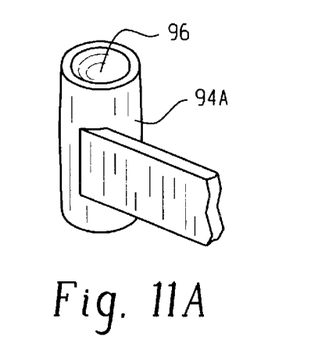
FIGS. 11A–11B show enlarged views of the end posts of the unit of FIGS. 9–10.
Figure 11B:
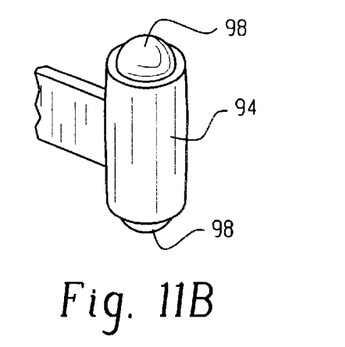

In still another embodiment shown in FIGS. 9 and 10, heat accumulator units 80 are generally triangular in shape and may include three side walls 82A, 82B, 82C. Again, heat accumulator elements 86 are arranged in rows 84 and columns 88. The elements 86 are integrally joined in both the row direction and column direction, but it is recognized that they could be integrally joined in only one direction, or in a non-linear manner. End posts 94A, 94B, and 94C may be provided, with end post 94A having bores 96 in both upper and lower ends (FIG. 11A), and with end post 94C having protrusions 98 in both upper and lower ends (FIG. 11B) for insertion into bores 96 when the units are stacked. The end posts 94 may be sized to provide vertical spacing between side walls of vertically adjacent units to provide suitable air flow through the steam generator. Further, as noted above relative to the previously described rectangular units, the side walls could be eliminated entirely. Alternative structure could be provided on each unit for stacking purposes similar to the alternatives described above relative to the rectangular units.

As shown in FIG. 10, the row and column pattern is arranged off-center relative to axes 100 and 102, where axis 100 is defined by a line extending between the center of stacking post 94A and the center of stacking 94B and axis 102 is defined by a line extending between the center of between sides 82A and 82B. In particular, the distance X between axis 102 and column axis 106 is less than the distance Y between axis 100 and row axis 108. The difference between the two distances X and Y is selected to allow alignment of multiple elements 86 of one unit with respective openings or open spaces 87 of another unit when the units are vertically stacked. In the case of the illustrated triangular units, the triangular units 80 are rotated about a horizontal axis 103 relative to each other for the purpose of stacking. In particular, each unit 80 may have a defined top side 90 and a defined bottom side 92. FIG. 10 shows a unit 80 with its bottom side up. A next unit 80 to be stacked on the unit of FIG. 10 would be flipped top side up so that side wall 82B of the top unit aligns with the side wall 82A of the lower unit. A next unit of the stack would be positioned bottom side up and so on.

Figure 12:
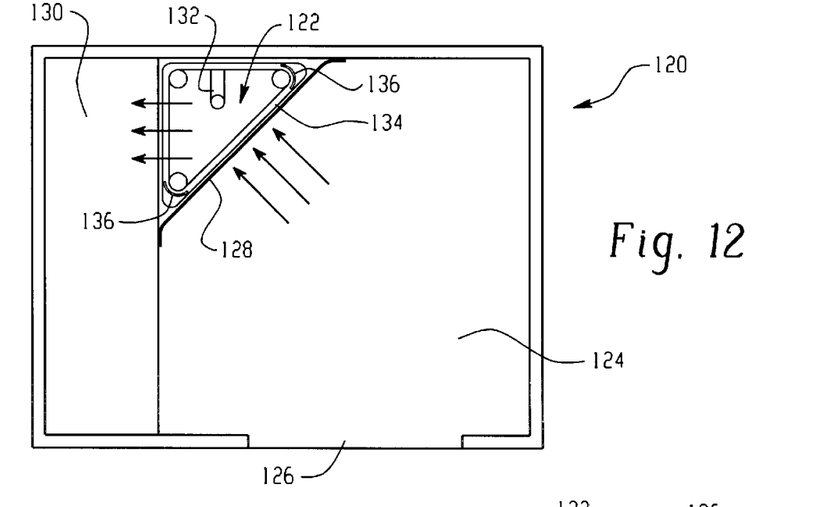
FIG. 12 shows a top view of an oven including a steam generator formed by the units of FIGS. 9–10.
Figure 13:
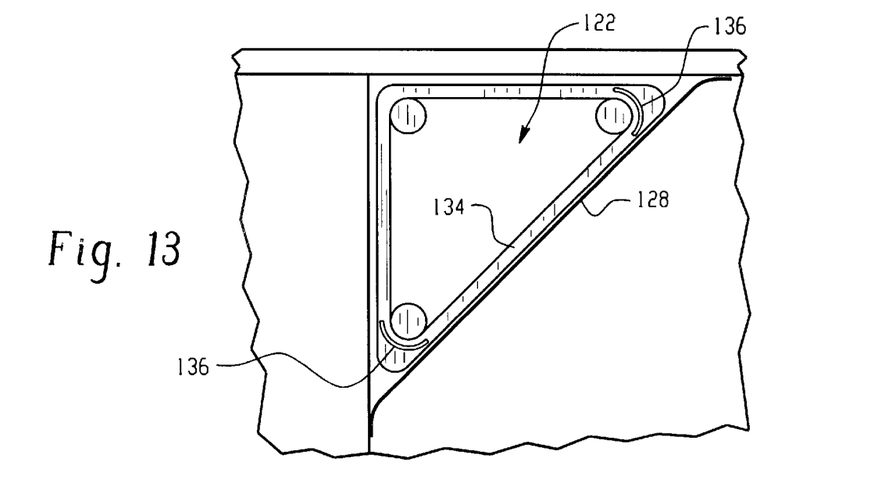
FIG. 13 shows an enlarged view of the steam generator of FIG. 12.

FIG. 12 shows a top view of a baking oven 120 including a steam generator 122 formed of triangular units 80. The baking chamber 124 includes an access door 126. The steam generator 122 could be positioned directly within a corner of the baking chamber 124, or a suitable panel 128 could be used to limit access to the steam generator 122 from within the baking chamber 124. The panel 128 could include appropriate perforations or slots to allow a portion of the heated air from the baking chamber to flow to the steam generator. Oven air flows from within chamber 124, across the steam generator 122 and into oven segment 130 where a suitable heat exchanger and blower may be provided as previously described. Piping 132 to supply water for steam generation is also shown. As shown in the enlarged partial top view of FIG. 12, a frame may be provided with a base 134 with one or more c-shaped vertical support panels 136 extending upward from the base to receive and add stability to the steam generator 122. Suitable cross-supports could be provided as needed between panels 136 to provide more stability. The base 134 may include a suitable water receptacle and drain pipe.

While generally rectangular and generally triangular embodiments are described above, it is recognized that heat accumulator units could be formed of other suitable shapes that would allow similar units to be stacked, with each unit having a different orientation than any adjacent heat accumulator unit, to provide desired positioning of multiple heat accumulator elements of one unit below openings of a vertically adjacent, higher unit. Additionally, where stacking structure (such as sidewalls, posts or other protrusions, apertures and variations and combinations thereof) is provided on each heat accumulator unit, the row and column pattern formed by the heat accumulator elements of each unit may be positioned off-center relative to the stacking structure to provide desired positioning of multiple heat accumulator elements of one unit below openings of a vertically adjacent, higher unit. In other embodiments the heat accumulator elements might be arranged in another type of pattern.

It is to be clearly understood that the above description is intended by way of illustration and example only and is not intended to be taken by way of limitation. Other changes and modifications could be made, including both narrowing and broadening variations and modifications of the appended claims.

What is claimed is:

1. A steam generator for use in a convection oven comprising:
a plurality of similar heat accumulator units, each of the similar heat accumulator units having a plurality of heat accumulator elements arranged in a row and column pattern, a plurality of open spaces being defined between the heat accumulator elements of the row and column pattern, a position of each heat accumulator element being fixed relative to other heat accumulator elements of the row and column pattern; and
wherein the similar heat accumulator units are vertically stacked, with each heat accumulator unit rotated relative to any vertically adjacent heat accumulator unit so that multiple heat accumulator elements of each heat accumulator unit align with respective open spaces of any vertically adjacent heat accumulator unit.

2. The steam generator of claim 1 wherein each heat accumulator unit is rotated about a vertical axis relative to any vertically adjacent heat accumulator unit.

3. The steam generator of claim 2 wherein each heat accumulator unit is generally rectangular in shape.

4. The steam generator of claim 1 wherein each heat accumulator unit is rotated about a horizontal axis relative to any vertically adjacent heat accumulator unit.

5. The steam generator of claim 4 where each heat accumulator unit is generally triangular in shape.

6. The steam generator of claim 1 wherein each heat accumulator unit includes at least two stacking protrusions and at least two stacking bores, each stacking protrusion of each heat accumulator unit engaging a respective stacking bore of a vertically adjacent heat accumulator unit.

7. The steam generator of claim 1 wherein each heat accumulator unit includes associated complimentary stacking feet.

8. The steam generator of claim 1 further comprising a frame for holding a plurality of vertically stacked similar heat accumulator units.

9. The steam generator of claim 1 further comprising a source of water positioned above the plurality of vertically stacked similar heat accumulator units.

10. A steam generator for use in a convection oven comprising:
- a plurality of similar heat accumulator units, each of the similar heat accumulator units having a plurality of heat accumulator elements arranged in a row and column pattern, a position of each heat accumulator element being fixed relative to other heat accumulator elements of the row and column pattern, the row and column pattern being positioned off-center relative to a first side wall and a second side wall of the unit; and
- wherein the similar heat accumulator units are vertically stacked in an alternating sequence with the first side wall of each heat accumulator unit aligned with the second side wall of any vertically adjacent heat accumulator unit so that multiple heat accumulator elements of each heat accumulator unit align with respective open spaces of any vertically adjacent heat accumulator unit.

11. The steam generator of claim 10 wherein the first side wall and second side wall of each heat accumulator unit is generally parallel and each heat accumulator unit is substantially rectangular.

12. The steam generator of claim 11 wherein the first side wall and the second side wall of each heat accumulator unit are non-parallel and each heat accumulator unit is substantially triangular, the first side wall of each heat accumulator unit vertically spaced apart from the second side wall of any adjacent heat accumulator unit.

13. A steam generator for use in a convection oven comprising:
- first and second similar heat accumulator units, each heat accumulator unit having:
  - stacking means;
  - a plurality of heat accumulator elements arranged in a row and column pattern that is positioned off-center relative to the stacking means, a plurality of open spaces being defined between the heat accumulator elements of the row and column pattern, a position of each heat accumulator element being fixed relative to other heat accumulator elements of the row and column pattern;
- wherein the first and second heat accumulator units are vertically stacked adjacent each other, stacking means of the first heat accumulator unit contacting stacking means of the second heat accumulator unit, the first heat accumulator unit having an orientation that is different than an orientation of the second heat accumulator unit so that multiple heat accumulator elements of the first heat accumulator unit align with respective open spaces of the second heat accumulator unit.

14. The steam generator of claim 13 wherein the stacking means of each heat accumulator unit comprises at least first and second wall members.

15. The steam generator of claim 13 wherein the stacking means of each heat accumulator unit comprises at least one stacking protrusion and at least one stacking bore.

16. The steam generator of claim 13 wherein the stacking means of each heat accumulator unit comprises at least two stacking protrusions and at least two stacking bores.

17. The steam generator of claim 13 wherein the first heat accumulator unit is rotated relative to the second heat accumulator unit.

18. The steam generator of claim 13, further comprising at least a third heat accumulator unit similar to the first and second heat accumulator units, the third heat accumulator unit vertically stacked adjacent a select one of the first and second heat accumulator units, the third heat accumulator unit having an orientation that is different than the orientation of the select one of the first and second heat accumulator units and that is the same as the orientation of the other of the first and second heat accumulator units.

19. The steam generator of claim 13 further comprising a source of water positioned above the plurality of vertically stacked similar heat accumulator units.

20. A steam generator for use in a convection oven comprising:
- a plurality of similar heat accumulator units, each of the similar heat accumulator units having:
  - a plurality of heat accumulator elements and a plurality of open spaces defined between the heat accumulator elements, a position of each heat accumulator element being fixed relative to other heat accumulator elements of the unit; and
- wherein the similar heat accumulator units are vertically stacked, with each heat accumulator unit rotated relative to any vertically adjacent heat accumulator unit so that multiple heat accumulator elements of each heat accumulator unit align with respective open spaces of any vertically adjacent heat accumulator unit.

21. The steam generator of claim 20 wherein each heat accumulator unit is rotated about a vertical axis relative to any vertically adjacent heat accumulator unit.

22. The steam generator of claim 20 wherein each heat accumulator unit is rotated about a horizontal axis relative to any vertically adjacent heat accumulator unit.

23. A convection oven incorporating the steam generator of claim 20, the oven further comprising:
- a baking chamber;
- a heat exchanger located outside of the baking chamber;
- a blower for passing air over the heat exchanger to produce heated air and passing the heated air to the baking chamber; and
- wherein the steam generator is located to have heated air passed therethrough during operation of the blower, the steam generator including a source of water for delivering water onto the heat accumulator units.

24. The convection oven of claim 23 wherein the steam generator is located in a corner portion of the convection oven and is separated from the baking chamber by a panel.

* * * * *

UNITED STATES PATENT AND TRADEMARK OFFICE
CERTIFICATE OF CORRECTION

PATENT NO.     : 6,516,712 B1                                          Page 1 of 1
DATED          : February 11, 2003
INVENTOR(S)    : Philip A. Ratermann and Richard H. VanCamp It is certified that error appears in the above-identified patent and that said Letters Patent is hereby corrected as shown below:

<u>Title page,</u>
Item [73], Assignee, change the word "Piemark" to -- Premark --

<u>Column 8,</u>
Line 57, change the word "comer" to -- corner --

Signed and Sealed this

Tenth Day of June, 2003

JAMES E. ROGAN
*Director of the United States Patent and Trademark Office*